United States Patent [19]

Tani et al.

[11] Patent Number: 4,689,540
[45] Date of Patent: Aug. 25, 1987

[54] POSITION CONTROL IN A D.C. MOTOR

[75] Inventors: Zempei Tani, Tondabayashi; Kenji Hachimura; Noboru Kawai, both of Nara, all of Japan

[73] Assignee: Sharp Kabushiki Kaisha, Osaka, Japan

[21] Appl. No.: 862,205

[22] Filed: May 12, 1986

Related U.S. Application Data

[63] Continuation of Ser. No. 614,136, May 25, 1984, abandoned.

[30] Foreign Application Priority Data

May 31, 1983 [JP] Japan ................................. 58-98593

[51] Int. Cl.$^4$ .............................................. G05B 1/02
[52] U.S. Cl. .................................. 318/608; 318/594; 318/616; 318/314
[58] Field of Search ............... 318/606, 607, 608, 594, 318/592, 595, 561, 611, 615–618, 715, 721, 314, 327; 364/176, 182

[56] References Cited

U.S. PATENT DOCUMENTS

| | | | |
|---|---|---|---|
| 3,175,138 | 3/1965 | Kilroy | 318/594 |
| 3,686,547 | 8/1972 | Kelling | 318/594 |
| 3,721,882 | 3/1973 | Helms | 318/603 X |
| 3,786,333 | 1/1974 | Sommeria | 318/606 X |
| 3,932,796 | 1/1976 | Kreithen et al. | 318/685 |
| 4,021,714 | 5/1977 | Jones | 318/595 X |
| 4,221,998 | 9/1980 | Haught | 318/608 X |
| 4,315,198 | 2/1982 | Lin | 318/594 |
| 4,355,273 | 10/1982 | DuVall | 318/561 |
| 4,423,365 | 12/1983 | Turner | 318/561 |
| 4,429,267 | 1/1984 | Veale | 318/594 |
| 4,486,693 | 12/1984 | Hamati et al. | 318/561 |
| 4,511,830 | 4/1985 | Yamada et al. | 318/318 |
| 4,564,795 | 1/1986 | Falkes | 318/314 |
| 4,591,767 | 5/1986 | Korde | 318/314 |

Primary Examiner—William M. Shoop, Jr.
Assistant Examiner—Patrick C. Keane
Attorney, Agent, or Firm—Birch, Stewart, Kolasch & Birch

[57] ABSTRACT

A position control system for positioning a D.C. motor at a desired position operates in a speed detection mode in which the D.C. motor is driven to rotate at a predetermined high speed, and in a position detection mode wherein the position of the D.C. motor is precisely controlled. In the speed detection mode, the control circuit forms a phase-locked-loop (PLL) control circuit which compares the phases of the speed instructing pulse signal and the rectangular signal derived from the actual rotation of the D.C. motor. The motor speed is controlled in accordance with the phase difference between the speed instructing pulse signal and the rectangular signal derived from the actual rotation of the D.C. motor.

1 Claim, 4 Drawing Figures

POSITION CONTROL IN A D.C. MOTOR

This is a continuation of application Ser. No. 614,136, filed on May 25, 1984 and now abandoned.

BACKGROUND AND SUMMARY OF THE INVENTION

The present invention relates to a position control system in a D.C. motor.

In order to precisely control the position of a D.C. motor, the D.C. motor is generally controlled in two modes. The first mode is a speed detection mode wherein the rotating speed of the motor is controlled so that the motor rotates to a desired position at a fast speed. The second mode is a position detection mode, which is conducted after the completion of the speed detection mode. In the position detection mode, the motor position is precisely controlled so that the motor stops at the desired position.

In the conventional system, the motor speed control in the first mode is conducted by the frequency control method. The frequency control method inevitably produces a steady-state deviation between the instructed rotating speed and the actual rotating speed of the D.C. motor. The steady-state deviation varies depending on the load connected to the D.C. motor. Thus, the conventional system can not ensure a stable operation when the load connected to the D.C. motor changes.

Accordingly, an object of the present invention is to provide a D.C. motor position control system which ensures stable operation of the motor even when the load connected to the D.C. motor varies.

Another object of the present invention is to provide a D.C. motor position control system which precisely controls the position of the D.C. motor and stops the D.C. motor at a desired position.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, the D.C. motor rotation is controlled by the speed detection mode, and, then, the position detection mode. In the speed detection mode, phase-locked-loop (PLL) control is employed, wherein the phase of a motor position indicating signal and the phase of the speed instructing signal are compared so as to control the rotating speed of the D.C. motor. The phase-locked-loop (PLL) control eliminates any the steady-state deviation of the actual rotating speed with respect to the instructed speed. Therefore, an accurate speed control is achieved even when the load connected to the D.C. motor varies.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
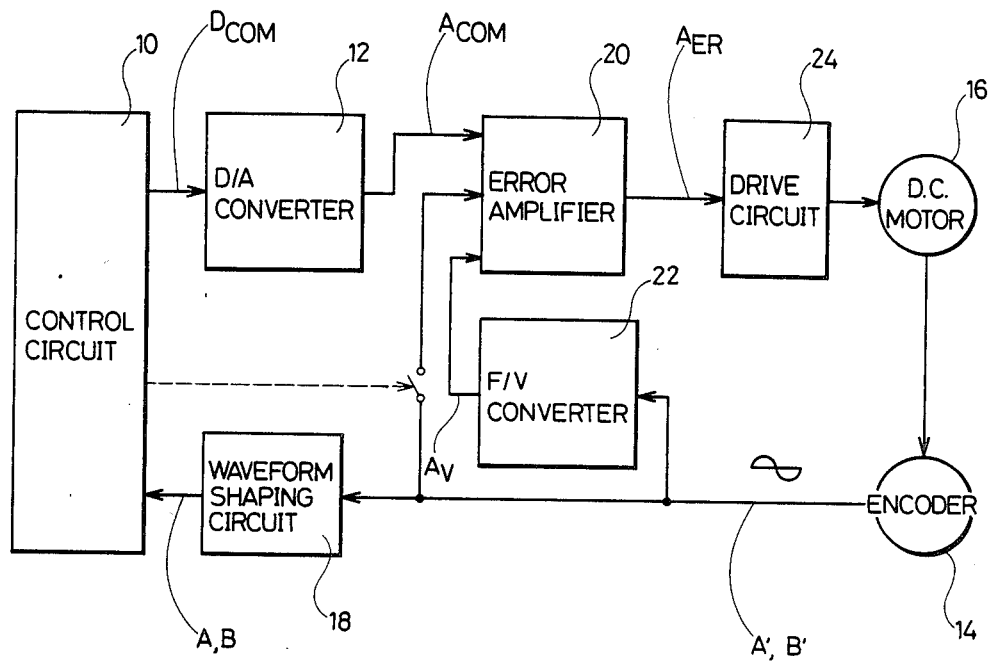
FIG. 1 is a block diagram of a D.C. motor position control system of the prior art.

In order to facilitate a complete understanding of the present invention, the conventional D.C. motor position control system will be first described with reference to FIG. 1.

The D.C. motor position control system generally operates in two modes; the speed detection mode, wherein the motor speed is controlled; and the position detection mode, wherein the D.C. motor position is controlled. The speed detection mode ensures a high speed rotation of the D.C. motor, and the position detection mode ensures a precise positioning of the D.C. motor.

The conventional D.C. motor position control system includes a control circuit 10, implemented by a microprocessor, which develops a speed instruction signal $D_{COM}$ toward a digital-to-analog converter 12. A rotary encoder 14 is secured to a spindle of a D.C. motor 16 so as to develop an approximate sinusoidal position indicating signal A', B' in response to the rotation of the D.C. motor 16. The approximate sinusoidal position indicating signal A', B' is applied to a waveform shaping circuit 18 which functions to digitalize the approximate sinusoidal position indicating signal A', B' so as to obtain a rectangular position indicating signal A, B. The thus obtained rectangular position indicating signal A, B is applied to the control circuit 10. The control circuit 10 calculates the system speed in accordance with the rectangular position indicating signal A, B to update the speed instruction signal $D_{COM}$ having a predetermined number of bits. The digital-to-analog converter 12 develops an analog speed instruction signal $A_{COM}$ toward an error amplifier 20. The approximate sinusoidal position indicating signal A', B' is further applied to a frequency-to-voltage converter 22, which develops a speed indicating signal $A_V$, functioning as a feedback signal, in accordance with the frequency of the approximate sinusoidal position indicating signal A'. The speed indicating signal $A_V$ is also applied to the error amplifier 20. The error amplifier 20 develops an error signal $A_{ER}$ to a drive circuit 24 which applies a drive signal to the D.C. motor 16.

Now assume that the D.C. motor 16 is in the stationary condition, and an instruction is applied to the system to place the D.C. motor 16 at a desired position. The system first operates in the open-loop mode because the feedback signal is not applied from the frequency-to-voltage converter 22 at the initial state. Accordingly, the drive circuit 24 supplies the maximum current to the D.C. motor 16 (see FIGS. 2(A) and 2(B), from T1 to T2). When the rotating speed of the D.C. motor 16 reaches the maximum speed at the time T2, the system functions to cut the speed instruction signal $D_{COM}$ ($A_{COM}$) from the control circuit 10 so as to reduce the accelerating torque. Therefore, the D.C. motor 16 is controlled in the closed-loop mode so that the D.C. motor 16 continues to rotate at the maximum speed.

Figure 2A:
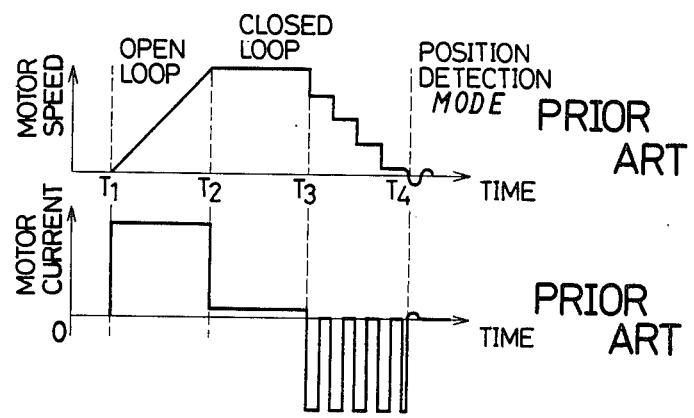
FIGS. 2(A) and 2(B) are charts for explaining an operational mode of the control system of FIG. 1.
Figure 2B:

When the current position of the D.C. motor 16 becomes near the target position, the control circuit 10 reduces the speed value of the speed instruction signal $D_{COM}$ ($A_{COM}$) (T3 in FIGS. 2(A) and 2(B)). The voltage applied to the drive circuit 24 is reduced so that the braking force is applied to the D.C. motor 16. The braking force is progressively applied to the D.C. motor 16, and the D.C. motor 16 reaches the minimum speed (T4 in FIGS. 2(A) and 2(B)).

Thereafter, the system operation is shifted to the position detection mode in order to precisely position the D.C. motor 16 at a desired position. The D.C. motor 16 holds the desired position due to the electrical detent force thereof.

In the position detection mode, the zero cross point of the approximate sinusoidal position indicating A' (or B') is utilized to control the system operation. More specifically, the approximate sinusoidal position indicating signal A' (or B') is introduced into the error amplifier 20 so as to form a high gain feedback loop in connection with the position of the D.C. motor 16.

As discussed above, in the conventional system, the motor speed in the speed detection mode is controlled by the frequency controlling method. That is, the two approximate sinusoidal position indicating signals A' and B' (which have the phase difference 90° from each other) are applied to the frequency-to-voltage converter 22 in order to detect the rotating frequency of the D.C. motor 16. The speed indicating signal $A_V$ has the voltage level proportional to the detected frequency. The motor rotating speed is controlled by comparing the voltage level of the speed indicating signal $A_V$ and the analog speed instruction signal $A_{COM}$ at the error amplifier 20.

However, the frequency controlling method inevitably produces the steady-state deviation between the instructed rotating speed and the actual rotating speed of the motor. The steady-state deviation varies depending on the load connected to the motor. Therefore, the conventional system can not ensure a stable operation when the load connected to the motor varies.

Figure 3:
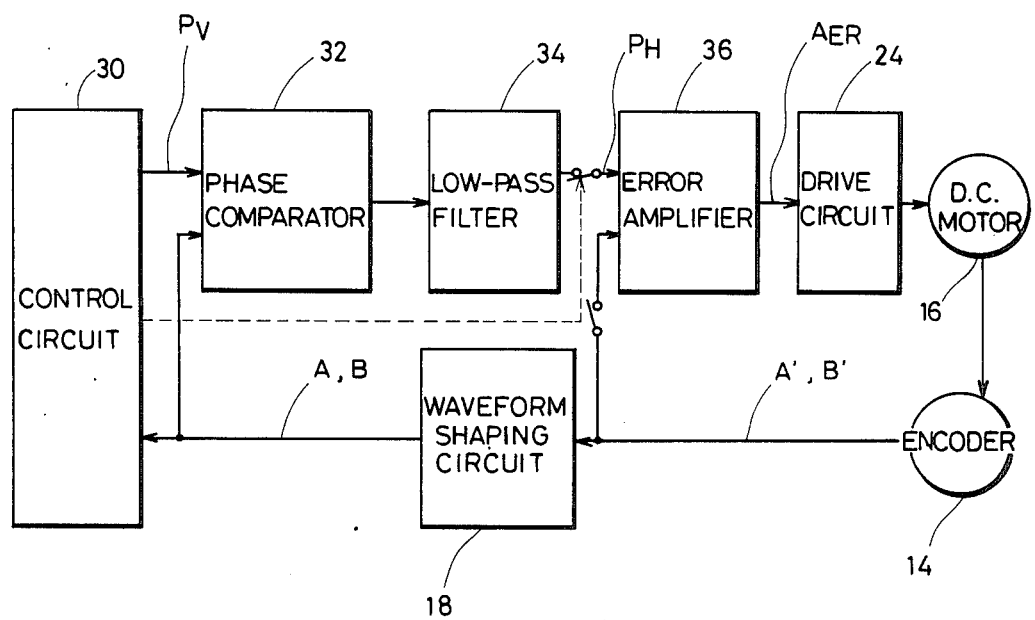
FIG. 3 is a block diagram of an embodiment of a D.C. motor position control system of the present invention.

FIG. 3 shows an embodiment of the motor position control system of the present invention. Like elements corresponding to those of FIG. 1 are indicated by like numerals.

A control circuit 30, implemented with a microprocessor, receives the rectangular position indicating signal A, B from the waveform shaping circuit 18, and develops a speed instructing pulse signal $P_V$ with a predetermined frequency (period) in accordance with the position information derived from the rectangular position indicating signal A, B. A phase comparator 32 compares the phase of the speed instructing pulse signal $P_V$ with the phase of the rectangular position indicating signal A or B. The phase difference is applied to a low-pass filter 34. The low-pass filter 34 develops a phase difference signal $P_H$ toward an error amplifier 36.

That is, in the present invention, the motor speed control is achieved in the phase-locked-loop (PLL) manner, wherein the phase of the rectangular position indicating signal A, B is compared with the phase of the speed instruction pulse signal $P_V$. The PLL control does not produce the steady-state deviation between the actual speed of the motor and the instructed motor speed.

As is well known, the PLL control system includes the phase comparator, the low-pass filter, the amplifier and the voltage controlled oscillator. In the embodiment of FIGURE 3, the respective elements are implemented by the following elements.

(1) phase comparator: phase comparator 32;
(2) low-pass filter: low pass filter 34;
(3) amplifier: error amplifier 36;
(4) voltage controlled oscillator: drive circuit 24, D.C. motor 16, encoder 14, and waveform shaping circuit 18.

During the motor speed detection mode, the motor speed is controlled by the PLL manner. When the motor reaches a position close to the target position, and the motor speed is reduced to the minimum value, the control is shifted to the position detection mode. In the position detection mode, the phase difference signal $P_H$ is not applied from the low-pass filter 34 to the error amplifier 36. Instead thereof, the approximate sinusoidal position indicating signal A', B' is applied to the error amplifier 36 to precisely locate the D.C. motor 16 at the target position.

The invention being thus described, it will be obvious that the same may be varied in many ways. Such variations are not to be regarded as a departure from the spirit and acope of the invention, and all such modifications are intended to be included within the scope of the following claim.

What is claimed is:

1. A position control system for a D.C. motor comprising:
    a D.C. motor;
    a rotary encoder associated with said D.C. motor, said rotary encoder developing an approximate sinusoidal position indicating signal in response to the rotation of said D.C. motor;
    a waveform shaping circuit connected to receive said approximate sinusoidal position indicating signal from said rotary encoder, and developing a rectangular position indicating signal;
    a main control circuit, responsive to said rectangular position indicating signal which develops a speed instructing pulse signal, dependent upon said rotation of said D.C. motor;
    a phase comparator which receives said rectangular position indicating signal and said speed instructing pulse signal from said waveform shaping circuit and said main control circuit, respectively, and develops a signal representative of the phase difference between said rectangular position indicating signal and said speed instructing pulse signal;
    a low pass filter which receives said signal developed from said phase comparator, and develops a filtered phase difference signal;
    error amplifier means for developing an error signal with references to said filtered phase difference signal developed from said low pass filter or said approximate sinusoidal position indicating signal developed from said rotary encoder;
    driver means for activating said D.C. motor in accordance with said error signal developed from said error amplifier means; and
    switching means, responsive to said main control circuit, for selectively applying one of said filtered phase difference signal and said approximate sinusoidal position indicating signal to said error amplifier means said switching means functioning in a speed detection mode to apply said filtered phase difference signal to said error amplifier means before said D.C. motor reaches a position close to a target position, and to apply said approximate sinusoidal position indicating signal to said error amplifier means when said D.C. motor reaches said position close to said target position to place said system in a position detection mode.

* * * * *